(12) United States Patent
Kaneko

(10) Patent No.: US 12,322,028 B2
(45) Date of Patent: Jun. 3, 2025

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Chiaki Kaneko, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 100 days.

(21) Appl. No.: 18/056,098

(22) Filed: Nov. 16, 2022

(65) Prior Publication Data

US 2023/0162427 A1    May 25, 2023

(30) Foreign Application Priority Data

Nov. 19, 2021 (JP) ................................ 2021-188574

(51) Int. Cl.
*G06T 15/04* (2011.01)
*B29C 33/38* (2006.01)
*B29C 37/00* (2006.01)

(52) U.S. Cl.
CPC ............. *G06T 15/04* (2013.01); *B29C 37/00* (2013.01); *B29C 33/3835* (2013.01); *B29C 2037/903* (2013.01)

(58) Field of Classification Search
CPC ... G06T 15/04; B29C 37/00; B29C 2037/903; B29C 33/3835
See application file for complete search history.

(56) References Cited

U.S. PATENT DOCUMENTS

| 5,757,506 A * | 5/1998 | Tabatabaei | B22D 11/18 356/400 |
| 7,497,980 B2 * | 3/2009 | Xu | A61M 37/0015 264/219 |
| 7,785,098 B1 * | 8/2010 | Appleby | G21K 1/025 264/319 |
| 2010/0023149 A1 * | 1/2010 | Sanders | G06F 30/00 700/98 |
| 2011/0189440 A1 * | 8/2011 | Appleby | B29C 33/38 523/435 |
| 2015/0367694 A1 * | 12/2015 | Tsunoda | B29C 33/3835 703/1 |

(Continued)

FOREIGN PATENT DOCUMENTS

JP        2020040381 A        3/2020

*Primary Examiner* — YuJang Tswei
(74) *Attorney, Agent, or Firm* — Canon U.S.A., Inc. IP Division

(57) ABSTRACT

An information processing apparatus includes a shape data acquisition unit configured to acquire shape data indicating a three-dimensional shape of a mold for forming a molded product, a mold release direction acquisition unit configured to acquire a mold release direction in separating the molded product from the mold, a processing parameter acquisition unit configured to acquire a processing parameter for processing to be applied to a surface of the mold, a calculation unit configured to calculate, based on the shape data, the mold release direction and the processing parameter, a difference between a plurality of processing parameter maps each indicating a correspondence between a position on the surface of the mold and the processing parameter, and a notification unit configured to notify information about the difference.

11 Claims, 16 Drawing Sheets

(56) References Cited

U.S. PATENT DOCUMENTS

| | | | | |
|---|---|---|---|---|
| 2018/0001543 | A1* | 1/2018 | Yamasaki | B29C 49/78 |
| 2021/0213300 | A1* | 7/2021 | Hedaya | A61N 5/0622 |
| 2021/0214477 | A1* | 7/2021 | Yoshida | G02B 1/04 |
| 2021/0352192 | A1* | 11/2021 | Sharma | B42D 25/333 |
| 2021/0356572 | A1* | 11/2021 | Kadambi | G01S 17/87 |
| 2022/0187841 | A1* | 6/2022 | Ebrahimi Afrouzi | G05D 1/0274 |

* cited by examiner

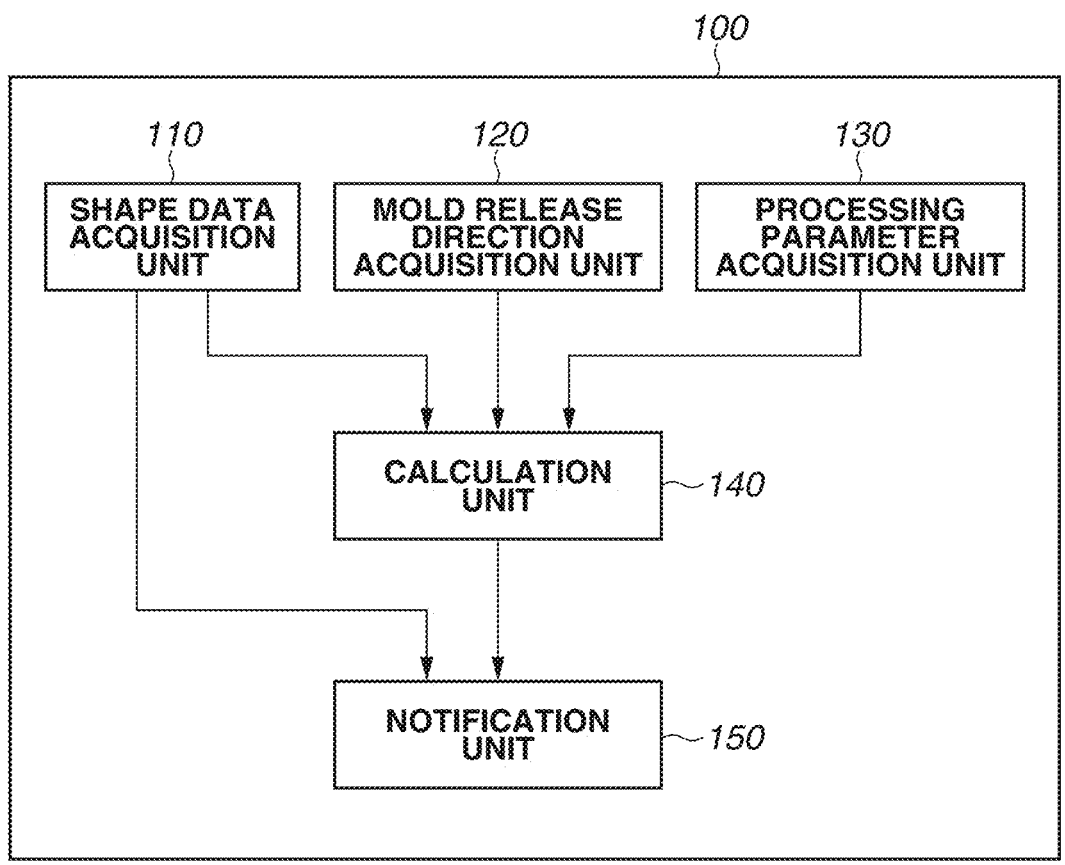

FIG.10

| TEXTURE NAME | PROCESSING DIAMETER [μm] | PROCESSING DEPTH [μm] | PROCESSING DENSITY [dot/mm$^2$] |
|---|---|---|---|
| MATERIAL A | $r_1$ | $d_1$ | $\rho_1$ |
| MATERIAL B | $r_1$ | $d_1$ | $\rho_2$ |
| ⋮ | ⋮ | ⋮ | ⋮ |

FIG.12

| DRAFT [deg] | PROCESSING DEPTH UPPER LIMIT [μm] |
|---|---|
| 15.00 | 8.0 |
| 14.25 | 7.5 |
| 13.50 | 7.0 |
| ⋮ | ⋮ |
| 0.00 | 0.0 |

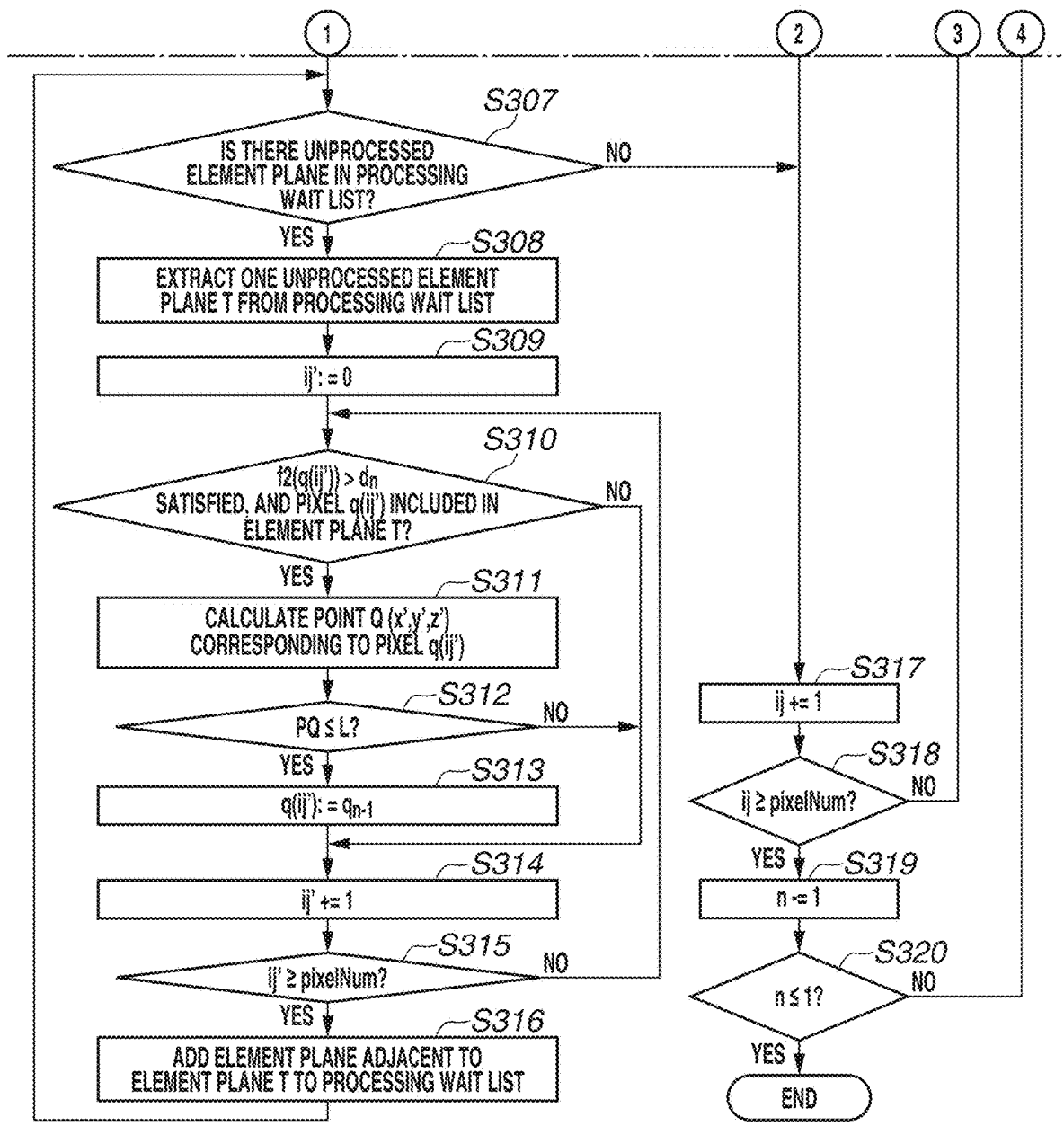

INFORMATION PROCESSING APPARATUS, INFORMATION PROCESSING METHOD, AND STORAGE MEDIUM

BACKGROUND

Field

The present disclosure relates to processing for supporting design of a mold to be used for forming a molded product.

Description of the Related Art

There is known a conventional technique that gives visual texture, such as glossiness and brightness, or tactile texture, such as grip feeling, by providing an invisible minute uneven structure on a surface of a resin product. Examples of the visual texture such as glossiness and brightness include low gloss matt-like texture and shiny metallic-like texture. Examples of the tactile texture such as grip feeling include rubber-like texture with moist feeling. There is also known a technique that gives so-called leather-tone coating texture by providing irregularities resembling leather and visible to the naked eye, and changing glossiness by giving minute asperities varying between the projected portion and the depressed portion of the irregularities.

In a case where such a resin product having an uneven structure is manufactured by injection molding or the like, it can be necessary to place various limits on the uneven structure to be provided. For example, if an outer surface of a molded product that is the resin product is inclined with respect to a mold release direction, or is formed of a curved surface, it can be unavoidable to omit an uneven structure in some regions in order to improve mold releasability.

Meanwhile, Japanese Patent Application Laid-Open No. 2020-40381 discusses a technique which is known as a technique for suppressing a reduction in quality of appearance in terms of design associated with omission of an uneven structure. In Japanese Patent Application Laid-Open No. 2020-40381, an outer surface is divided into a plurality of regions, and the difference in height between the projected portion and the depressed portion of an uneven structure (i.e., the height difference of irregularities) is gradually changed to achieve superior mold releasability and linearize a change in gloss level on the outer surface. In Japanese Patent Application Laid-Open No. 2020-40381, the gap in texture between a region with the uneven structure and a region without the uneven structure is thereby prevented from being perceived.

Depending on the shape of a molded product, the mold release direction, and the combination of types of texture to be given, a trade-off between excellence and poorness can occur between a plurality of evaluation items about the surface texture of the molded product, when the height difference of irregularities is changed as in the technique discussed in Japanese Patent Application Laid-Open No. 2020-40381. For example, in order to reproduce target texture faithfully over as wide region as possible on the surface of the molded product, it is desirable that the height difference of irregularities remain unchanged as much as possible in a range not interfering with the mold release. This is because the reproduced texture changes depending on the height difference of irregularities. On the other hand, in order to prevent the gap in texture from being perceived, it is desirable to reduce the amount of a change in the height difference of irregularities between regions. In other words, in order to maintain the continuity of the texture, it is desirable to gradually change the height difference of irregularities by securing a sufficient region width on the surface of the molded product. However, in a region where the height difference of irregularities is changed, the fidelity of the texture decreases depending on the amount of the change, and thus a region where the target texture is faithfully reproduced is narrow. In a case where such a trade-off occurs, it is necessary for a designer to adjust how to change the height difference of irregularities while considering a balance between evaluation items.

However, for example, in a case where the shape of a molded product is complicated, or in a case where one molded product is formed of the combination of a plurality of molds varying in mold release direction, there is an issue that it is difficult to identify a portion to be adjusted (i.e., a portion where a trade-off occurs).

SUMMARY

The present disclosure is directed to providing a mechanism that can identify a portion to be adjusted when a molded product is formed using a mold.

According to an aspect of the present disclosure, an information processing apparatus includes a shape data acquisition unit configured to acquire shape data indicating a three-dimensional shape of a mold for forming a molded product, a mold release direction acquisition unit configured to acquire a mold release direction in separating the molded product from the mold, a processing parameter acquisition unit configured to acquire a processing parameter for processing to be applied to a surface of the mold, a calculation unit configured to calculate, based on the shape data, the mold release direction and the processing parameter, a difference between a plurality of processing parameter maps each indicating a correspondence between a position on the surface of the mold and the processing parameter, and a notification unit configured to notify information about the difference.

Further features of the present disclosure will become apparent from the following description of exemplary embodiments with reference to the attached drawings.

BRIEF DESCRIPTION OF THE DRAWINGS

FIG. 2 is a diagram illustrating an example of a logical configuration of the information processing apparatus according to the first exemplary embodiment.

FIG. 10 is a diagram illustrating an example of a correspondence table indicating the correspondence between a texture name and a processing control parameter in the first exemplary embodiment.

FIG. 12 is a diagram illustrating an example of a processing upper limit look-up table (LUT) in the first exemplary embodiment.

FIGS. 13A and 13B are flowcharts illustrating an example of a detailed processing procedure of processing for generating a processing parameter map emphasizing continuity.

DESCRIPTION OF THE EMBODIMENTS

Figure 1:
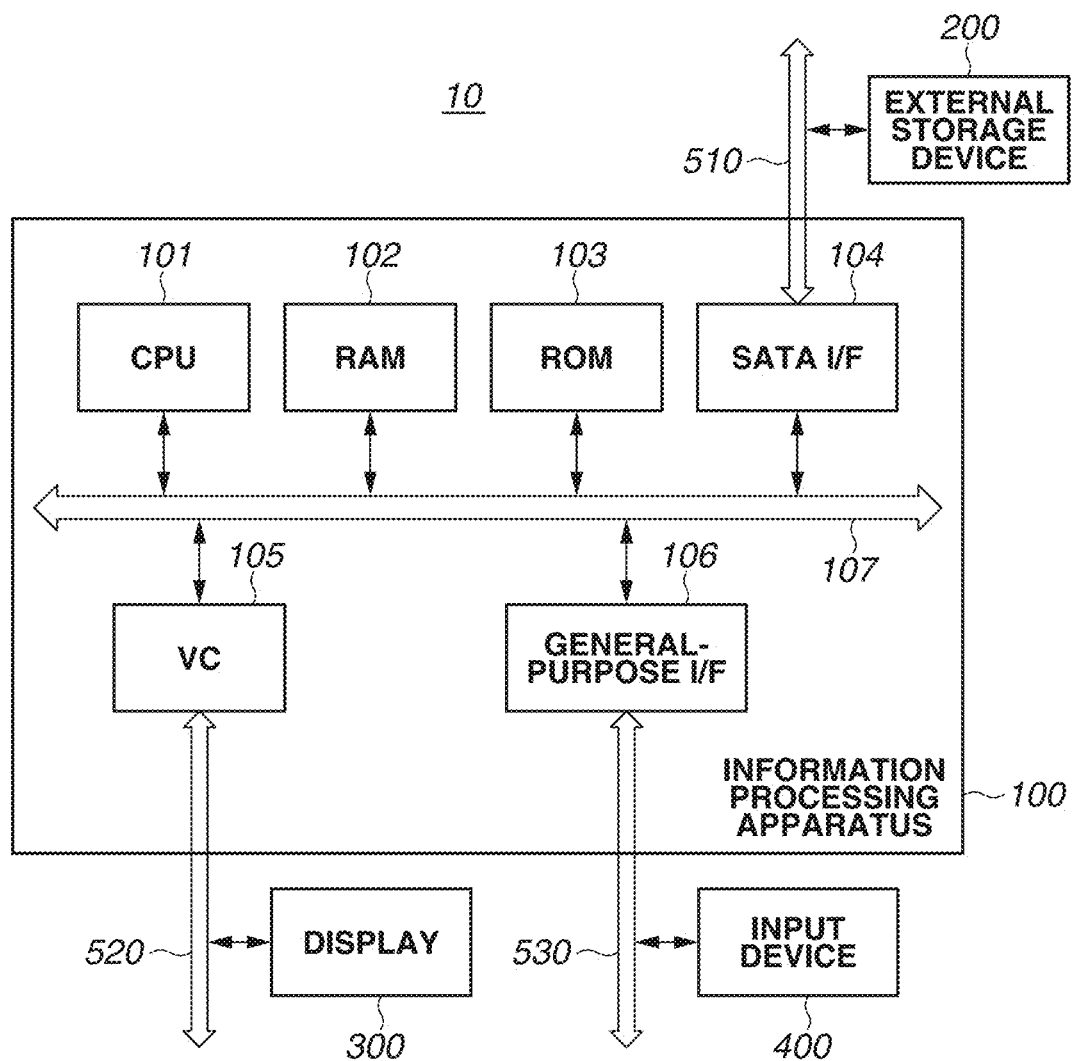
FIG. 1 is a diagram illustrating an example of a hardware configuration of an information processing system including an information processing apparatus according to a first exemplary embodiment.

Modes (exemplary embodiments) for carrying out the present disclosure will be described with reference to the drawings. Not all of combinations of features that will be described in the exemplary embodiments of the present disclosure are necessarily essential to the solution of the present disclosure. In the description, the same configurations will be assigned the same reference numerals.

A first exemplary embodiment of the present disclosure will be described.

FIG. 1 is a diagram illustrating an example of a hardware configuration of an information processing system 10 including an information processing apparatus 100 according to the first exemplary embodiment of the present disclosure. FIG. 2 is a diagram illustrating an example of a logical configuration of the information processing apparatus 100 according to the first exemplary embodiment of the present disclosure. Before the configuration of the information processing apparatus 100 illustrated in FIG. 1 and FIG. 2 is described, an uneven structure in the first exemplary embodiment of the present disclosure will be described.

Figure 3A:
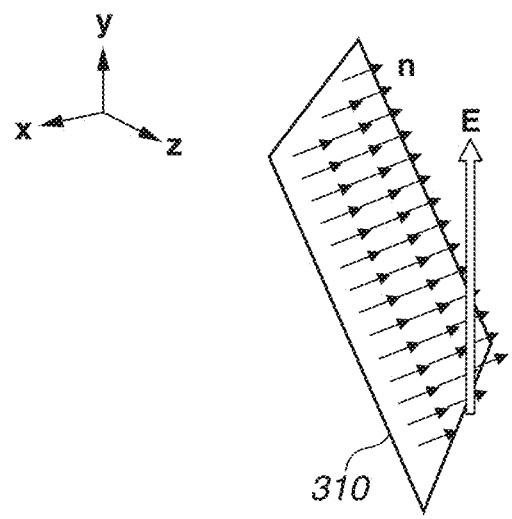
FIGS. 3A, 3B, and 3C are diagrams illustrating an uneven structure in the first exemplary embodiment.
Figure 3B:
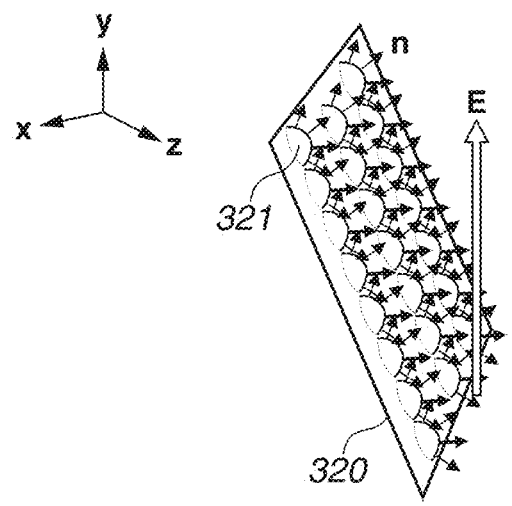
Figure 3C:
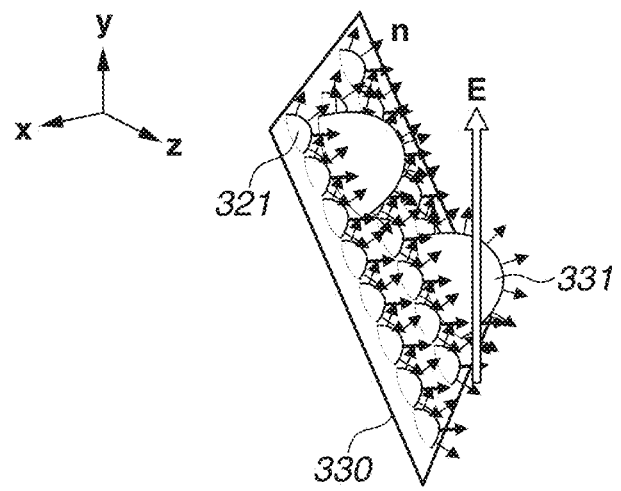

FIGS. 3A, 3B, and 3C are diagrams illustrating the uneven structure in the first exemplary embodiment of the present disclosure. An xyz coordinate system is illustrated in each of FIG. 3A to FIG. 3C.

As illustrated in FIG. 3A, on a flat surface 310 where the uneven structure is not provided, a normal vector n to the flat surface is the same direction at any position within the surface. The specular direction of light incident on the surface 310 is constant irrespective of position. For this reason, reflected light does not diffuse, and thus the surface 310 is perceived as a high gloss surface.

Meanwhile, as illustrated in FIG. 3B, on a surface 320 where minute projected portions 321 are provided as the uneven structure, normal vectors n point in various directions and thus reflected light diffuses. For this reason, perceived gloss on the surface 320 is lower than that on the surface 310. The larger the number of the projected portions 321 is, the more greatly the normal vectors n vary, and the normal vector n also varies depending on the shape (including the height, width, and geometric shape) of the projected portion 321. Accordingly, various kinds of gloss can be given to the surface of a molded product, by changing the density or shapes of the projected portions 321 provided as the uneven structure.

As illustrated in FIG. 3C, a surface 330 is a low gross surface where the minute projected portions 321 are densely provided and second projected portions 331 minute but relatively larger than the minute projected portions 321 are interspersed, and an extremely small region corresponding to the second projected portion 331 appears to shine brightly on the surface 330. Various kinds of brightness can be given by changing the shapes and density of the second projected portions 331. Various kinds of texture such as grip feeling and leather-tone coating texture can be given by providing an uneven structure formed of combination of a plurality of projected portions varying in shape, other than those illustrated in FIGS. 3B and 3C. For example, various kinds of grip feeling can be given by changing the coefficient of friction of the surface of a molded product by providing minute projected portions. Visible projected portions (hereinafter referred to as "island part") can be interspersed on the surface of a molded product, and further, in order to provide higher gloss in the island part than in other region (hereinafter referred to as "sea part"), the surface of each of the island part and the sea part can be provide with minute projected portions varying between the island part and the sea part. The texture of leather-tone coating can be thereby given.

The uneven structure described above can be formed on the surface of a molded product, by processing (micro processing) the surface of a mold to form inversed irregularities, using a processing machine such as a cutting machine or a laser beam machine. For example, a depressed portion formed on the surface of the mold by processing (micro processing) is transferred to resin as the projected portion 321 or the projected portion 331 on the molded product, and the depth of the depressed portion formed on the surface of the mold by processing is the height of the projected portion 321 or the projected portion 331 on the molded product. In the present exemplary embodiment, as a parameter (hereinafter referred to as "processing control parameter") for controlling processing (micro processing) by the processing machine, each of a processing diameter r, a processing depth d, and a processing density p is used.

Figure 4:
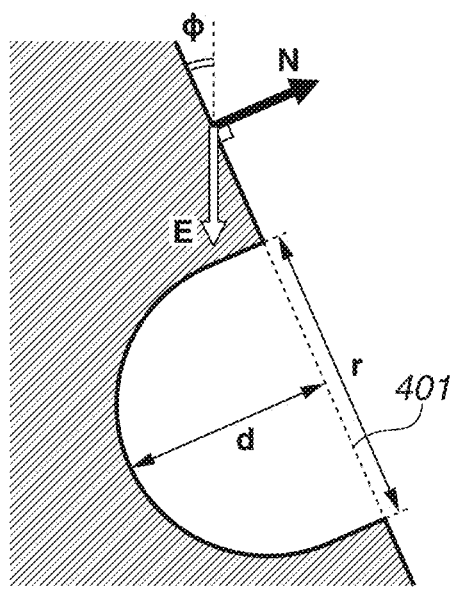
FIG. 4 is a diagram illustrating a processing control parameter in the first exemplary embodiment.

FIG. 4 is a diagram illustrating the processing control parameter in the first exemplary embodiment of the present disclosure. Specifically, the processing diameter r and the processing depth d are each illustrated in FIG. 4, as one type of the processing control parameter.

In FIG. 4, a shaded portion represents a steel material of a mold. The processing diameter r is a processing control parameter corresponding to a tool diameter in a cutting machine, or a spot diameter of a laser beam in a laser beam machine. The processing depth d is a processing control parameter indicating a depth of processing, using a surface 401 of the mold before an uneven structure is formed by processing (micro processing), as a reference (depth zero). The processing density p that is one type of the processing control parameter is a parameter for controlling the number of depressed portions to be formed by processing, in unit area.

When the mold is actually fabricated, data (hereinafter referred to as "processing pattern") indicating the correspondence between a position on the surface of the mold and the processing depth d is generated, based on shape data of the surface of the mold before the uneven structure is formed by processing (micro processing), and the processing density p. This processing pattern is input to a computer aided manufacturing (CAM) system. The processing pattern which is the input data is converted into a processing program such as numerical control (NC) data by the CAM system, and the processing program is sent to a computer numerical control (CNC) processing machine, so that processing is executed.

In general, in a case where an uneven structure is provided on the surface of a molded product, a mold release resistance tends to increase. Accordingly, giving texture to the surface of the molded product can cause a difficulty in the mold release. For example, in a case where the mold is moved in a direction indicated by an arrow E in FIG. 3C for the mold release when the surface 330 in FIG. 3C is formed on the surface of the molded product, the large projected portion 331 on the surface of the molded product catches on the mold, which causes a mold release failure. In a case where a difficulty in the mold release occurs and the difficulty cannot be addressed even if, for example, the mold release direction is changed or a release agent is used, it is desirable to locally reduce the heights of the projected portions disturbing the mold release, and thus it is desirable to reduce the processing depth d for a partial region of the surface of the mold. However, a region where the processing depth d is reduced and a region where the processing depth d is not reduced are different in terms of the texture of the surface of the molded product, depending on the amount of the change in the processing depth d.

Figure 5A:
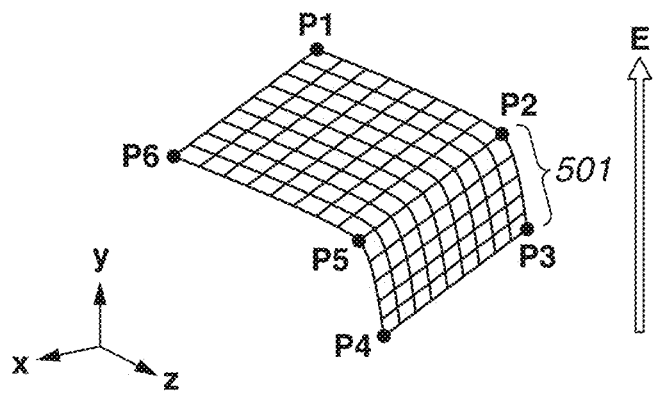
FIGS. 5A, 5B, and 5C are diagrams illustrating examples of a surface shape of a mold and a processing depth in the first exemplary embodiment.
Figure 5B:
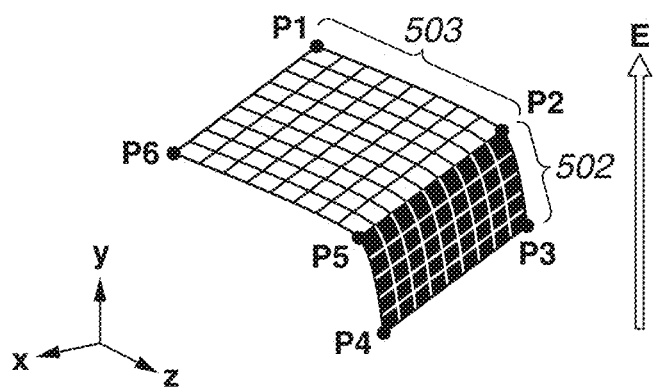
Figure 5C:
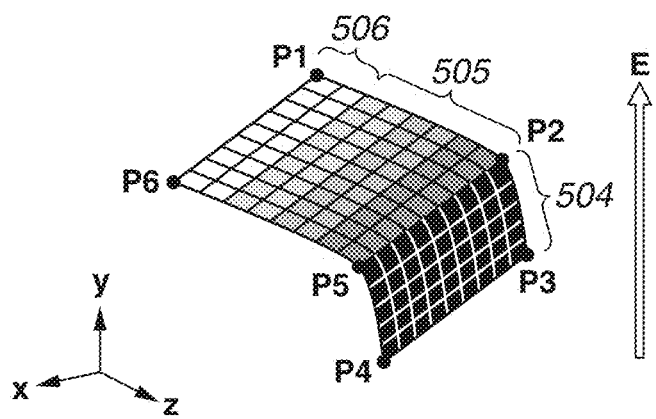
Figure 6A:
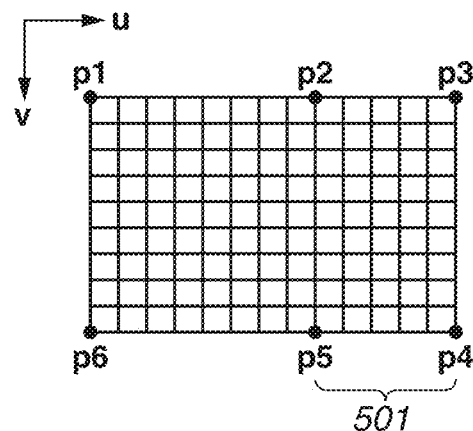
FIGS. 6A, 6B, and 6C are diagrams illustrating examples of developments corresponding to FIGS. 5A, 5B, and 5C.
Figure 6B:
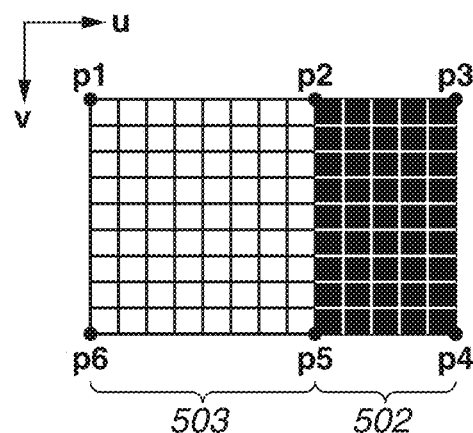
Figure 6C:
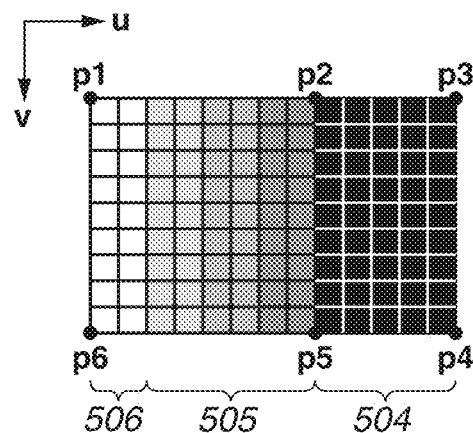

FIGS. 5A, 5B, and 5C are diagrams illustrating examples of the surface shape of the mold and the processing depth d in the first exemplary embodiment of the present disclosure. An xyz coordinate system is illustrated in each of FIG. 5A to FIG. 5C. FIGS. 6A, 6B, and 6C are diagrams illustrating examples of developments corresponding to FIGS. 5A, 5B, and 5C in the first exemplary embodiment of the present disclosure. In each of FIG. 6A to FIG. 6C, a uv coordinate system is illustrated as a coordinate system that determines the plane of the development.

Points P1 to P6 on the surface of the mold in FIG. 5A correspond to points P1 to P6 on the development in FIG. 6A, and this also applies to FIGS. 5B and 5C corresponding to FIGS. 6B and 6C. In FIGS. 5A to 5C and FIGS. 6A to 6C, a processing depth $d_{target}$ for reproducing desired texture is expressed by white, the processing depth d being zero is expressed by black, and the smaller the processing depth d is, the darker the color expressing the processing depth d is.

FIG. 5A and FIG. 6A illustrate an example in which the processing depth $d_{target}$ is used for the entire surface of the mold. In the example illustrated in FIG. 5A and FIG. 6A, the normal direction to the plane is inclined with respect to a mold release direction E to a great extent in a region 501, and the mold release is difficult in a case where the uneven structure is provided. In contrast, FIG. 5B and FIG. 6B illustrate an example in which the processing depth d is reduced to the upper limit for enabling the mold release, in order to prevent occurrence of a difficulty in the mold release, and to minimize a reduction in the fidelity of the texture to be reproduced on the surface of the molded product. FIG. 5C and FIG. 6C illustrate an example in which the processing depth d is gradually changed to prevent occurrence of a difficulty in the mold release, and to maintain the continuity of the texture to be reproduced on the surface of the molded product.

In FIG. 5B and FIG. 6B, a region 502 is a region where the processing depth d is zero, i.e., a region where the uneven structure is not provided, and the mold release can be performed without difficulty. However, in FIG. 5B and FIG. 6B, the region 502 and a region 503 where the processing depth is $d_{target}$ are adjacent to each other, and thus the difference in texture between these regions appears clearly at the boundary, so that a gap is perceived.

In FIG. 5C and FIG. 6C, a region 505 where the processing depth d is gradually changed is located between a region 504 where the processing depth d is zero and a region 506 where the processing depth d is $d_{target}$. Accordingly, in FIG. 5C and FIG. 6C, the difference in texture between the regions adjacent to each other is not easily perceived. In FIG. 5C and FIG. 6C, however, the area of the region 506 where the processing depth is $d_{target}$ (i.e., the desired texture is faithfully reproduced) is smaller than the area of the region 503 in FIG. 5B and FIG. 6B. In this way, it is often difficult to make both of an evaluation item of the emphasis on fidelity and an evaluation item of the emphasis on continuity in the surface texture of the molded product best at the same time, and a trade-off between the evaluation items occurs in some region.

Two-dimensional image data in which the processing depth d is recorded in association with the position on the surface of the mold will be referred to as "processing parameter map". In the present exemplary embodiment, a processing parameter map emphasizing each item is generated for each evaluation item in the surface texture of the molded product, and a region where a trade-off occurs (i.e., a trade-off region), which is a portion to be adjusted, is notified based on the difference between processing parameter maps.

<Hardware Configuration>

A hardware configuration of the information processing system 10 including the information processing apparatus 100 according to the present exemplary embodiment will be described with reference to FIG. 1.

As illustrated in FIG. 1, the information processing system 10 includes the information processing apparatus 100, an external storage device 200, a display 300, an input device 400, and serial buses 510 to 530.

As illustrated in FIG. 1, the information processing apparatus 100 includes a central processing unit (CPU) 101, a random access memory (RAM) 102, a read only memory (ROM) 103, a serial ATA interface (SATA I/F) 104, a video card (VC) 105, a general-purpose I/F 106, and a system bus 107.

The CPU 101 executes an operating system (OS) and various programs stored in devices such as the ROM 103 and the external storage device 200, using the RAM 102 as a work memory.

The OS and various programs may be stored in an internal storage device. The CPU 101 controls each hardware configuration via the system bus 107. A program code stored in the ROM 103, the external storage device 200, or the like is loaded into the RAM 102, and the loaded program code is executed by the CPU 101, so that processing in a flowchart to be described below is executed.

The external storage device 200 is connected to the SATA I/F 104 via the serial bus 510. The external storage device 200 is a hard disk drive (HDD) or a solid state drive (SSD).

The display 300 is connected to the VC 105 via the serial bus 520.

The input device 400 including a mouse and a keyboard is connected to the general-purpose I/F 106 via the serial bus 530.

The CPU 101 displays a graphical user interface (GUI) provided by a program on the display 300 via the VC 105, and receives input information representing a user instruction obtained via the input device 400.

The information processing apparatus 100 is, for example, implemented by a desktop personal computer (PC). Alternatively, the information processing apparatus 100 may be implemented by a notebook PC or tablet PC integrated with the display 300.

The external storage device 200 can be implemented by a medium (a storage medium) and an external storage drive for accessing this medium. A flexible disk (FD), a compact disc read only memory (CD-ROM), a digital versatile disc (DVD), a Universal Serial Bus (USB) memory, a magneto-optical disc (MO), or a flash memory can be used for the medium.

<Logical Configuration>

A logical configuration of the information processing apparatus 100 according to the present exemplary embodiment will be described with reference to FIG. 2.

The CPU 101 illustrated in FIG. 1 executes a program stored in the ROM 103, using the RAM 102 as a work memory, so that the information processing apparatus 100 functions as the logical configuration illustrated in FIG. 2. Not all of processes to be described below are necessarily executed by the CPU 101, and the information processing apparatus 100 may be configured so that some or all of the processes are performed by one or more processing circuits other than the CPU 101.

As illustrated in FIG. 2, the information processing apparatus 100 includes a shape data acquisition unit 110, a mold release direction acquisition unit 120, a processing parameter acquisition unit 130, a calculation unit 140, and a notification unit 150.

The shape data acquisition unit 110 is, for example, a shape data acquisition unit configured to acquire shape data indicating a three-dimensional shape of a mold for forming a molded product, from the ROM 103, the external storage device 200, or the like, based on a user instruction input via the input device 400. Specifically, the shape data in the present exemplary embodiment is polygon data in which the surface shape of a mold before an uneven structure is formed by processing (micro processing) is expressed by a group of a plurality of planes. In other words, the shape data represents the shapes of the planes of a mold that are in contact with resin for forming a molded product before texture is given. The shape data consists of a list of the three-dimensional xyz coordinates of vertexes forming the plurality of planes, and the two-dimensional uv coordinates (so-called texture coordinates) corresponding the three-dimensional xyz coordinates.

Figure 7A:
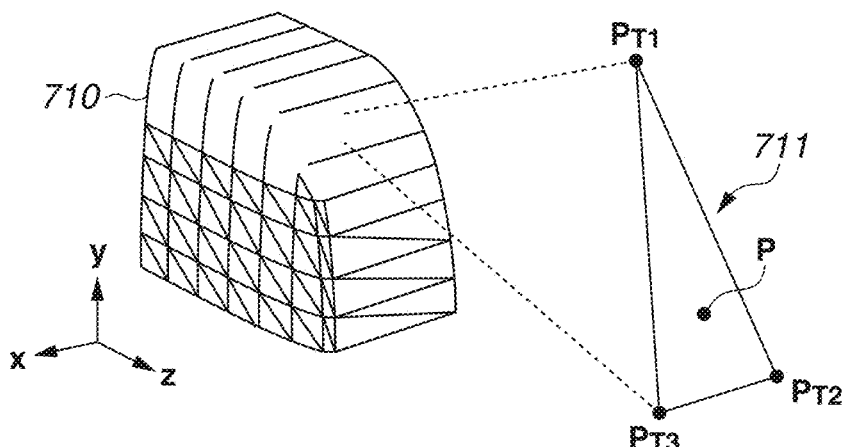
FIGS. 7A, 7B, and 7C are diagrams illustrating an example of a surface shape of a mold represented by shape data in each of the first exemplary embodiment and a second exemplary embodiment.
Figure 7B:
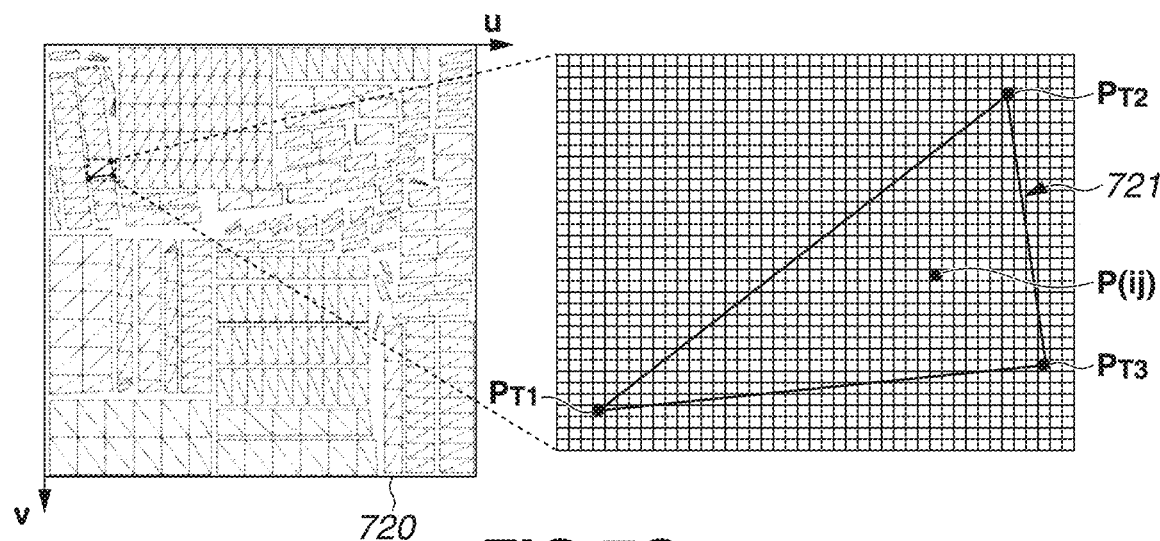
Figure 7C:
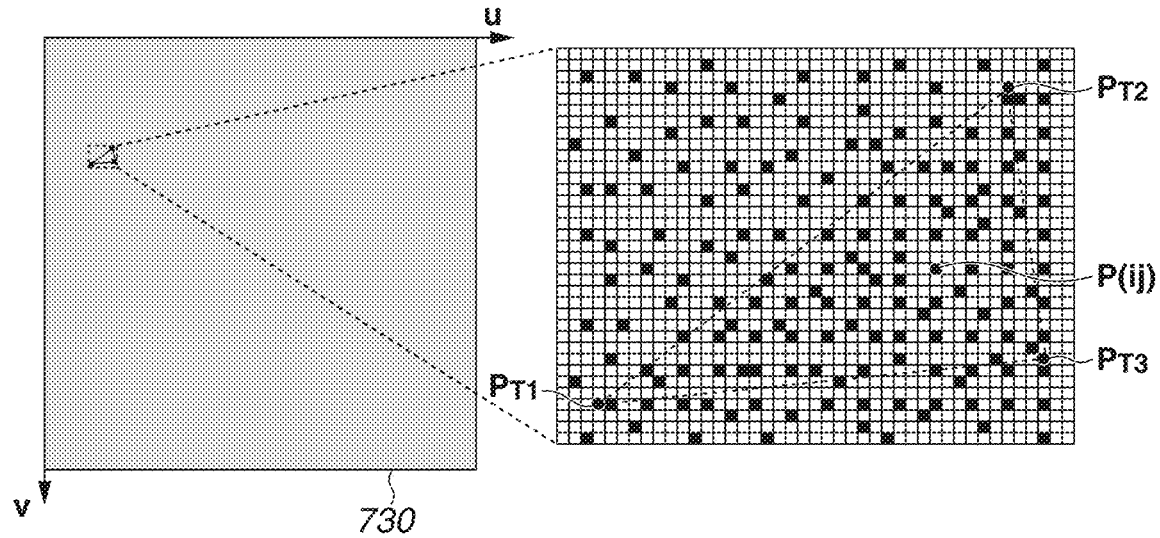

FIGS. 7A, 7B, and 7C are diagrams illustrating an example of the surface shape of the mold expressed by the shape data in the first exemplary embodiment of the present disclosure.

FIG. 7A illustrates an example of a surface shape (i.e., the plane shape indicated by the shape data) 710 of the mold expressed by the polygon in an xyz coordinate space. FIG. 7B illustrates an example of the development (a development 720) of the surface of the mold developed on a uv coordinate plane. A rectangle $P_{T1}P_{T2}P_{T3}$ (a rectangle 711) illustrated in FIG. 7A is one of a plurality of planes (hereinafter referred to as "element planes") forming the surface shape 710 and expressed in the xyz coordinate space. A rectangle $P_{T1}P_{T2}P_{T3}$ (a rectangle 721) illustrated in FIG. 7B is the same one element plane expressed on the uv coordinate plane. In other words, points $P_{T1}$, $P_{T2}$, and $P_{T3}$ in the xyz coordinate space illustrated in FIG. 7A and points $P_{T1}$, $P_{T2}$, and $P_{T3}$ on the uv coordinate plane illustrated in FIG. 7B correspond to each other.

The shape data acquired by the shape data acquisition unit 110 is transmitted to the calculation unit 140 and the notification unit 150.

The mold release direction acquisition unit 120 is, for example, a mold release direction acquisition unit configured to acquire a mold release direction in separating a molded product from a mold based on a user instruction input via the input device 400. Specifically, in the present exemplary embodiment, the mold release direction acquisition unit 120 acquires a three-dimensional vector (a mold release direction vector) indicating a mold release direction, as the mold release direction. The mold release direction vector acquired by the mold release direction acquisition unit 120 is transmitted to the calculation unit 140.

The processing parameter acquisition unit 130 is, for example, a processing parameter acquisition unit that acquires a processing parameter for processing (micro processing) to be applied to the surface of a mold based on a user instruction input via the input device 400. Specifically, in the present exemplary embodiment, the processing parameter acquisition unit 130 acquires each of the above-described processing control parameters and a processing upper limit look-up table (LUT) to be described below, as the processing parameter. The processing control parameters include the processing depth d for reproducing desired surface texture (i.e., a target processing depth). The processing parameter acquisition unit 130 acquires a LUT (a processing upper limit LUT) indicating the correspondence between a draft and an upper limit value of the processing depth d enabling the mold release, from the ROM 103, the external storage device 200, or the like. Here, the draft is an angle representing an inclination of the surface of the mold with respect to the mold release direction, and is illustrated as an angle φ in FIG. 4. The upper limit value of the processing depth d enabling the mold release is smaller, as the draft φ illustrated in FIG. 4 is smaller. The processing control parameters and the processing upper limit LUT each acquired as the processing parameter by the processing parameter acquisition unit 130 are transmitted to the calculation unit 140.

The calculation unit 140 is a calculation unit configured to generate a plurality of processing parameter maps each indicating the correspondence between the position on the surface of the mold and the processing parameter based on the received shape data, mold release direction vector and processing parameter, and calculates the difference between the plurality of processing parameter maps. Specifically, in the present exemplary embodiment, the plurality of processing parameter maps includes at least a processing parameter map related to the surface texture of the molded product. To be more specific, in the present exemplary embodiment, the plurality of processing parameter maps includes a first processing parameter map emphasizing the fidelity of the surface texture of the molded product and a second processing parameter map emphasizing the continuity of the surface texture of the molded product. In this case, the calculation unit 140 may be configured to calculate the difference between the first processing parameter map emphasizing the fidelity of the surface texture of the molded product and the second processing parameter map emphasizing the continuity of the surface texture of the molded product. The difference between the plurality of processing parameter maps calculated by the calculation unit 140 is transmitted to the notification unit 150.

The notification unit 150 is a notification unit configured to notifies information about the difference between the plurality of processing parameter maps transmitted from the calculation unit 140. Specifically, in the present exemplary embodiment, the notification unit 150 notifies the information, by displaying a trade-off region, which is a portion to be adjusted, on the display 300, based on the difference between the plurality of processing parameter maps.

<Processing to Be Executed>

Figure 8:
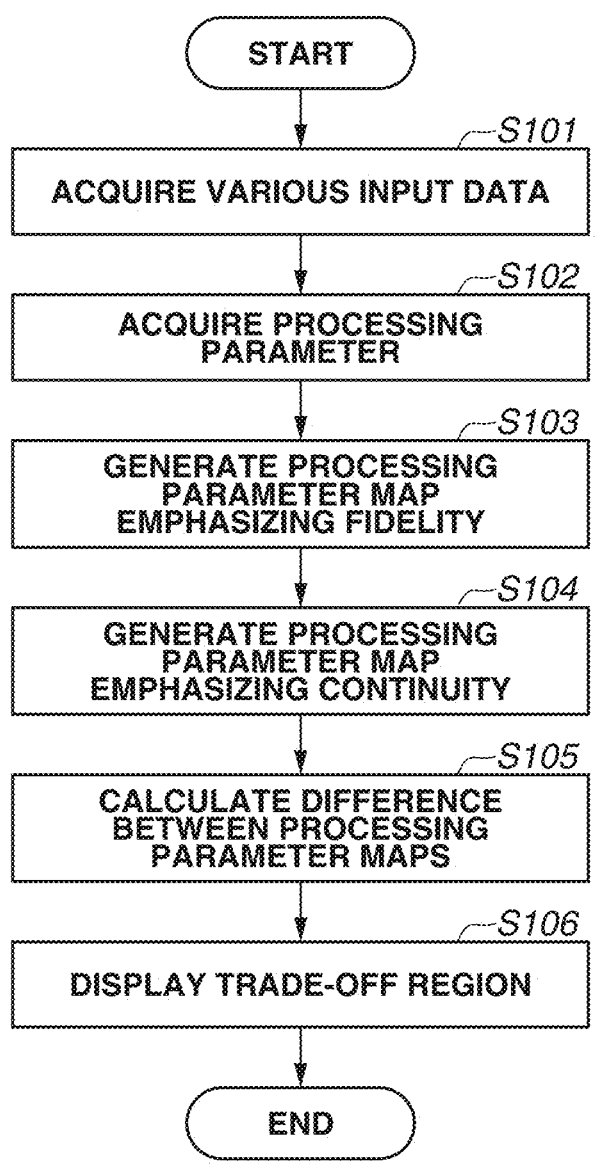
FIG. 8 is a flowchart illustrating an example of a processing procedure of an information processing method by the information processing apparatus according to the first exemplary embodiment.

FIG. 8 is a flowchart illustrating an example of a processing procedure of an information processing method performed by the information processing apparatus 100 according to the first exemplary embodiment of the present disclosure.

First, in step S101 in FIG. 8, the shape data acquisition unit 110 acquires shape data indicating the three-dimensional shape of a mold for forming a molded product based on a user instruction input via the input device 400. The mold release direction acquisition unit 120 acquires a mold release direction vector in separating the molded product from the mold based on a user instruction input via the input device 400. Further, the processing parameter acquisition unit 130 acquires a texture name based on a user instruction input via the input device 400. In other words, in step S101, various input data based on user instructions are acquired by the shape data acquisition unit 110, the mold release direction acquisition unit 120, and the processing parameter acquisition unit 130. The user instructions will be described with reference to FIG. 9.

Figure 9:
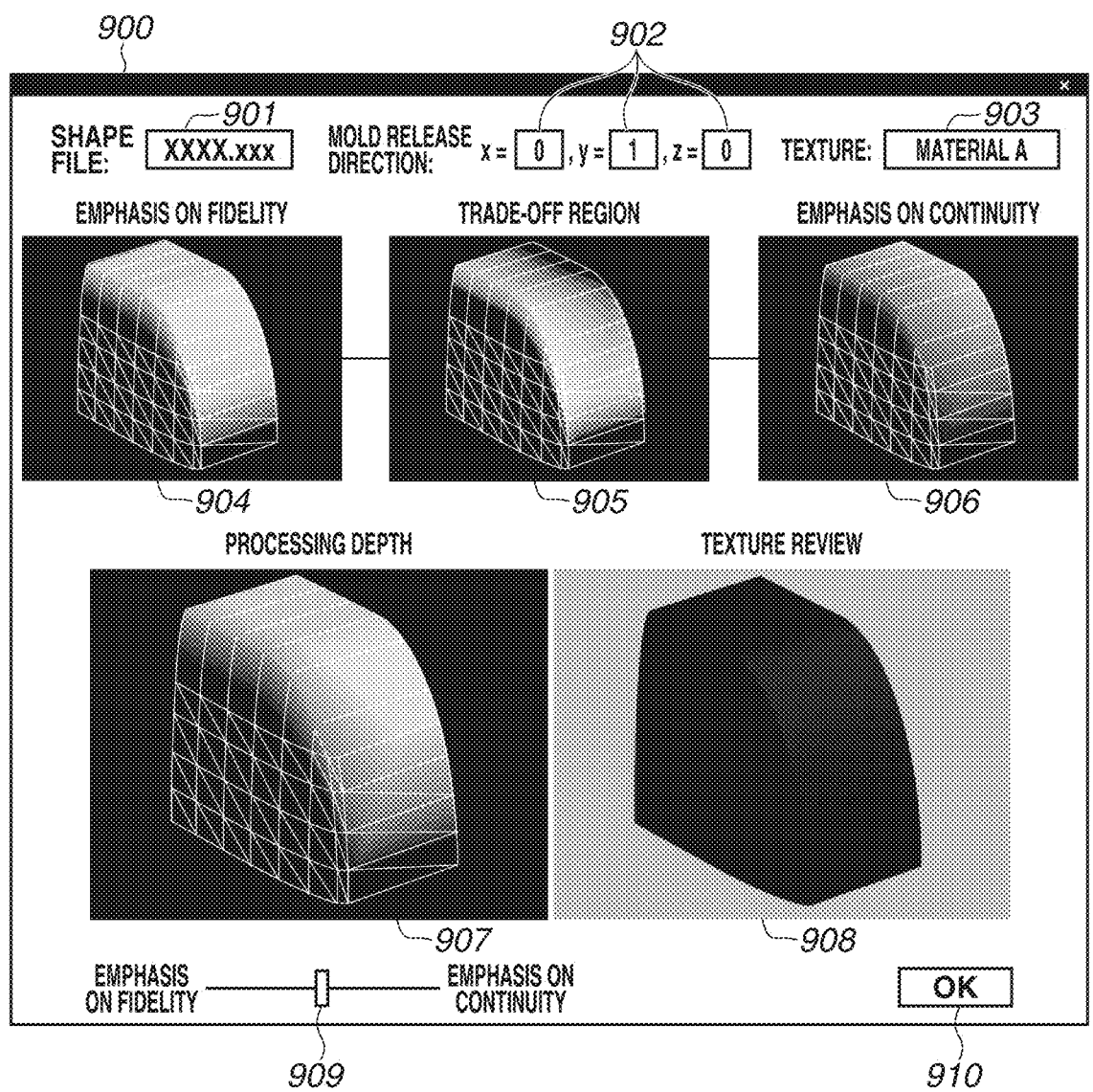
FIG. 9 is a diagram illustrating an example of a graphical user interface (GUI) in the first exemplary embodiment.

FIG. 9 is a diagram illustrating an example of a GUI displayed on the display 300 in FIG. 1, in the first exemplary embodiment of the present disclosure.

In a GUI 900 illustrated in FIG. 9, a shape setting field 901 is, for example, a field for a user to input the path of a file in which the shape data of a mold is recorded. In the GUI 900 illustrated in FIG. 9, a mold release direction setting field 902 is, for example, a field for the user to input a value for each of xyz components of a mold release direction vector. In the GUI 900 illustrated in FIG. 9, a texture setting field 903 is, for example, a field for the user to input a texture name representing texture that the user wants to give. In step S101 in FIG. 8, there can be adopted a mode in which the shape data acquisition unit 110, the mold release direction acquisition unit 120, and the processing parameter acquisition unit 130 acquire data input in the setting fields 901, 902, and 903, respectively, of the GUI 900 illustrated in FIG. 9.

In step S102 in FIG. 8, the processing parameter acquisition unit 130 acquires the processing control parameter corresponding to the texture name acquired in step S101, with reference to a correspondence table illustrated in FIG. 10. FIG. 10 is a diagram illustrating an example of the correspondence table indicating the correspondence between the texture name and the processing control parameter, in the first exemplary embodiment of the present disclosure. The correspondence table indicating the correspondence between the texture name and the processing control parameter illustrated in FIG. 10 can be generated by molding each of samples based on the combinations of values representing various processing diameters, processing depths, and processing densities, and associating the combined values with a name representing the feature of texture of each sample. Further, in step S102, the processing parameter acquisition unit 130 acquires the processing upper limit LUT described above. The correspondence table illustrated in FIG. 10 and the processing upper limit LUT are stored beforehand in the ROM 103 or the like. In step S102, the processing parameter acquisition unit 130 acquires the processing control parameters and the processing upper limit LUT, as the processing parameters for processing (micro processing) to be applied to the surface of the mold.

In step S103 in FIG. 8, the calculation unit 140 generates a processing parameter map emphasizing the fidelity of the surface texture of the molded product, using the shape data and the mold release direction vector acquired in step S101, and the processing parameters acquired in step S102. The processing parameter map emphasizing the fidelity generated in step S103 corresponds to "first processing parameter map". In the present exemplary embodiment, the processing parameter map emphasizing the fidelity is generated in step S103 by determining a maximum processing depth enabling the mold release for a point on the surface of the mold corresponding to each pixel of the processing parameter map, and recording the determined maximum processing depth as a pixel value. The processing parameter map in the present exemplary embodiment is an image in which a pixel position is expressed by uv coordinates, and the pixel value of a position (u,v) on the processing parameter map represents a processing depth for a position (x,y,z), which corresponds to (u,v), on the surface of a mold. The detailed processing procedure of step S103 will be described below with reference to FIG. 11.

In step S104, the calculation unit 140 generates a processing parameter map emphasizing the continuity of the surface texture of the molded product, using various kinds of information acquired in step S101 to step S103. Specifically, the calculation unit 140 generates the processing parameter map emphasizing the continuity, using the shape data acquired in step S101, the processing upper limit LUT acquired in step S102, and the processing parameter map emphasizing the fidelity generated in step S103. The processing parameter map emphasizing the continuity generated in step S104 corresponds to "second processing parameter map". In the present exemplary embodiment, the processing parameter map emphasizing the continuity in which the processing depth gradually changes is generated by securing region widths sequentially starting from a shallow processing width region on the surface of the mold based on the processing parameter map emphasizing the fidelity generated in step S103. The detailed processing procedure of this step S104 will be described below with reference to FIGS. 13A and 13B.

In step S105, the calculation unit 140 calculates a difference map representing the difference between the processing parameter map emphasizing the fidelity generated in step S103 and the processing parameter map emphasizing the continuity generated in step S104. Specifically, the calculation unit 140 calculates a pixel value Δf(p(ij)) of the difference map, based on the following equation (1), for all pixels.

$$\Delta f(p(ij)) = f1(p(ij)) - f2(p(ij)) \qquad (1)$$

In the equation (1), p(ij) represents an ij-th pixel in the map. In the equation (1), f1(p(ij)) represents the pixel value of a pixel p(ij) in the processing parameter map emphasizing the fidelity (i.e., the processing depth emphasizing the fidelity). In the equation (1), f2(p(ij)) represents the pixel value of a pixel p(ij) in the processing parameter map emphasizing the continuity (i.e., the processing depth emphasizing the continuity).

In step S106, the notification unit 150 displays a trade-off region, which is a portion to be adjusted in shape data, on the display 300, based on the shape data acquired in step S101 and the difference map calculated in step S105. A region where Δf(p(ij)) of the above-described equation (1) is not zero (also including a region that can be regarded as a region where Δf(p(ij)) is not substantially zero) is a region where the processing depth emphasizing the fidelity and the processing depth emphasizing the continuity are different from each other, and can be regarded as a region where the fidelity and the continuity are not compatible with each other. For this reason, in the present exemplary embodiment, the difference map is texture-mapped on the surface of the mold expressed by the shape data, and this is rendered, so that an image indicating the trade-off region is generated. The trade-off region is notified by displaying this image indicating the trade-off region on a GUI. Known computer graphics techniques may be used for the texture mapping and the generation of the rendering image.

The process in step S106 will be described with reference to FIG. 9.

In the GUI 900 illustrated in FIG. 9, a rendering image obtained by performing texture-mapping on the processing parameter map emphasizing the fidelity on the surface of the mold is displayed in a display region 904. In a display region 906, a rendering image obtained by performing texture-mapping on the processing parameter map emphasizing the continuity on the surface of the mold is displayed. In a display region 905, the above-described image indicating the trade-off region is displayed, and in the image, a brighter region represents a greater difference between the processing depth emphasizing the fidelity and the processing depth emphasizing the fidelity. Accordingly, the notification unit 150 notifies the information about the difference by displaying information representing color having intensity corresponding to the amount of the above-described difference in the shape data. The user can visually recognize the trade-off region by viewing the image in each of the display regions 904 to 906 in the GUI 900 displayed on the display 300.

Upon completion of the process in step S106, the processing in the flowchart illustrated in FIG. 8 ends.

☐Detailed Processing Procedure in Step S103 in FIG. 8☐

The detailed processing procedure of the processing for generating the processing parameter map emphasizing the fidelity in step S103 in FIG. 8 will be described.

Figure 11:
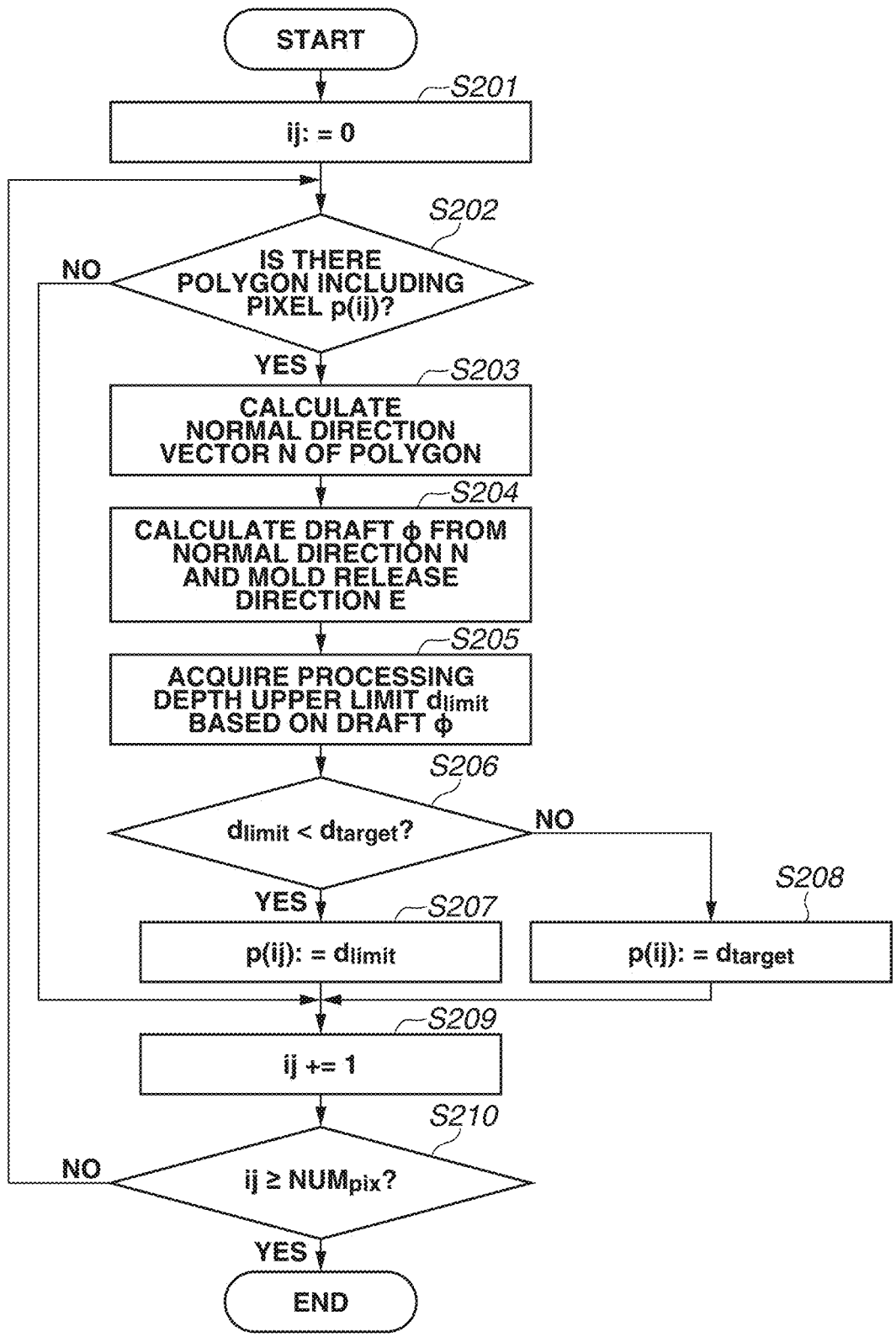
FIG. 11 is a flowchart illustrating an example of a detailed processing procedure of processing for generating a processing parameter map emphasizing fidelity.

FIG. 11 is a flowchart illustrating an example of the detailed processing procedure of the processing for generating the processing parameter map emphasizing the fidelity in step S103 in FIG. 8.

First, in step S201 in FIG. 11, the calculation unit 140 sets an index ij indicating a processing target pixel to 0.

In step S202, the calculation unit 140 determines whether there is an element plane $P_{T1}P_{T2}P_{T3}$ including a pixel p(ij) as illustrated in FIG. 7B on the uv coordinate plane, with reference to the shape data transmitted from the shape data acquisition unit 110.

As a result of the determination in step S202, in a case where there is an element plane including the pixel p(ij) (YES in step S202), the processing proceeds to step S203.

In step S203, the calculation unit 140 calculates a normal direction vector N to the element plane, by acquiring vertex coordinates (i.e., the coordinates of the points $P_{T1}$, $P_{T2}$, and $P_{T3}$ in FIG. 7A) in the xyz coordinate space of the element plane checked in step S202, with reference to the shape data.

In step S204, the calculation unit 140 calculates the draft tri described above with reference to FIG. 4 based on the normal direction vector N calculated in step S203 and the mold release direction vector E transmitted from the mold release direction acquisition unit 120.

In step S205, the calculation unit 140 acquires a processing depth upper limit $d_{limit}$ corresponding to the draft p calculated in step S204 with reference to the processing upper limit LUT sent from the processing parameter acquisition unit 130. FIG. 12 is a diagram illustrating an example of the processing upper limit LUT, in the first exemplary embodiment of the present disclosure. In the process in step S205, in a case where a value matching with the draft φ is not in the processing upper limit LUT illustrated in FIG. 12, the upper limit value of the processing depth corresponding to the maximum draft smaller than or equal to the draft φ is determined as the processing depth upper limit $d_{limit}$. In the example illustrated in FIG. 12, $d_{limit}$=8.0 may be determined in a case where the draft φ≥15.00, and $d_{limit}$=7.0 may be determined in a case where 13.50≤φ<14.25. The processing depth upper limit LUT illustrated in FIG. 12 can be generated by molding each of samples based on the combinations of various planes of drafts φ and processing depths d, and associating a maximum processing depth d achieving successful mold release with each of the drafts φ.

In step S206, the calculation unit 140 determines whether the processing depth upper limit $d_{limit}$ acquired in step S205 is smaller than the target processing depth $d_{target}$ transmitted from the processing parameter acquisition unit 130.

As a result of the determination in step S206, in a case where the processing depth upper limit $d_{limit}$ is smaller than the target processing depth $d_{target}$ (i.e., the mold release is difficult in a case where processing is performed using a depth desirable for reproduction of desired texture) (YES in step S206), the processing proceeds to step S207.

In step S207, the calculation unit 140 records the processing depth upper limit $d_{limit}$ for the pixel p(ij), as the pixel value of the pixel p(ij).

As a result of the determination in step S206, in a case where the processing depth upper limit $d_{limit}$ is not smaller than the target processing depth $d_{target}$ (NO in step S206), the processing proceeds to step S208.

In step S208, the calculation unit 140 records the target processing depth $d_{target}$ for the pixel p(ij), as the pixel value of the pixel p(ij).

In a case where the process in step S208 is completed, in a case where the process in step S207 is completed, or in a case where it is determined that there is no element plane including the pixel p(ij) in step S202 (NO in step S202), the processing proceeds to step S209.

In step S209, the calculation unit 140 increases the index ij by 1.

In step S210, the calculation unit 140 determines whether the index ij is larger than or equal to a total pixel number $NUM_{pix}$ of the processing parameter map. As a result of this determination, in a case where the index ij is smaller than the total pixel number $NUM_{pix}$ of the processing parameter map (NO in step S210), the processing returns to step S202 to perform the processes in step S202 and in steps after step S202 again.

As a result of the determination in step S210, in a case where the index ij is larger than or equal to the total pixel number $NUM_{pix}$ of the processing parameter map (YES in step S210), the processing in the flowchart illustrated in FIG. 11 ends.

The processing in step S201 to step S210 in FIG. 11 makes it possible to generate the processing parameter map emphasizing the fidelity, by which no difficulty in the mold release occurs and in which the processing depth as close to the processing depth d for reproducing desired texture as possible is recorded.

☐Detailed Processing Procedure in Step S104 in FIG. 8☐

Next, the detailed processing procedure of the processing for generating the processing parameter map emphasizing the continuity in step S104 in FIG. 8 will be described.

Figure 13A:
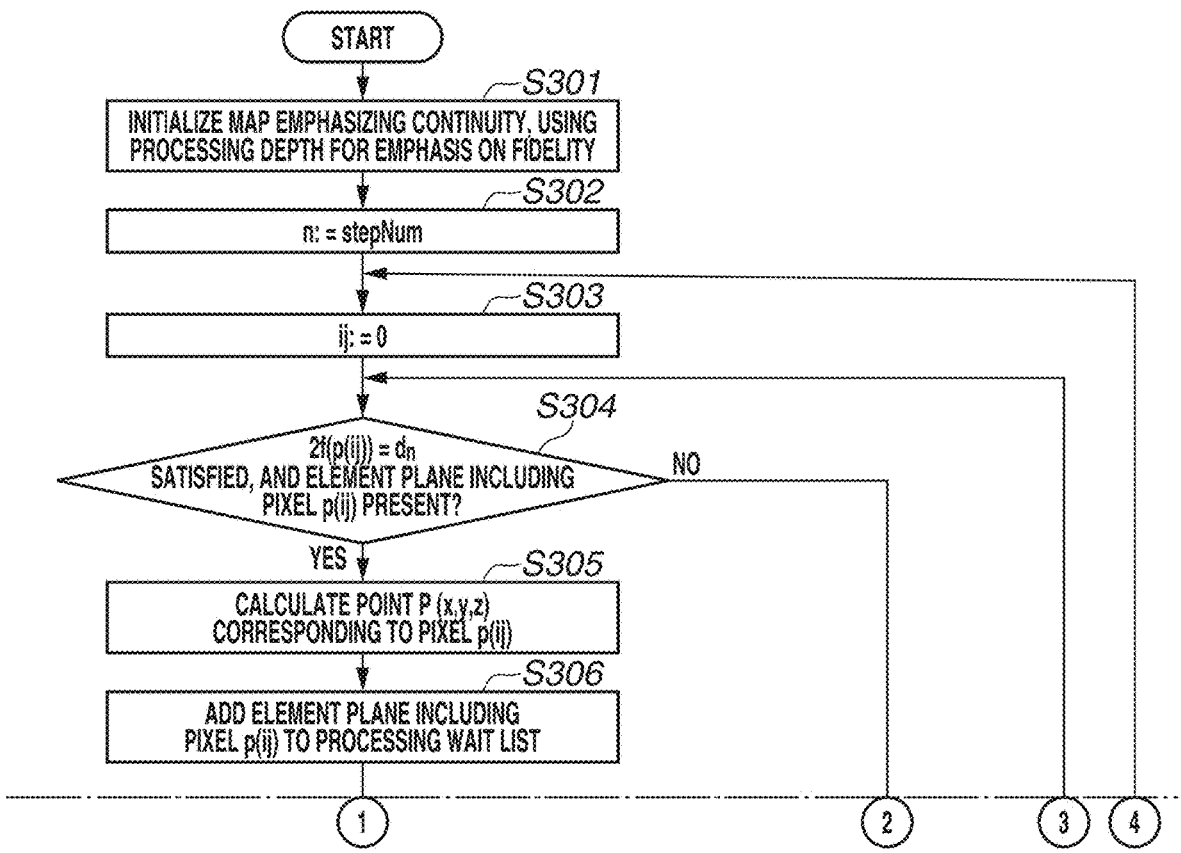

FIGS. 13A and 13B are flowcharts illustrating an example of the detailed processing procedure of the processing for generating the processing parameter map emphasizing the continuity in step S104 in FIG. 8.

In step S301 in FIG. 13A, the calculation unit 140 initializes the pixel value of the processing parameter map emphasizing the continuity, using the pixel value of the processing parameter map emphasizing the fidelity generated in step S103. Specifically, the calculation unit 140 records the same pixel value f1(p(ij)) as that of the processing parameter map emphasizing the fidelity generated in step S103, in all the pixels p(ij) of the processing parameter map emphasizing the continuity.

In step S302, the calculation unit 140 sets an index n indicating the processing depth d to $NUM_{step}$. $NUM_{step}$ is the number of steps of the processing upper limit LUT. An n-th deepest processing depth in the processing upper limit LUT will be hereinafter referred to as "$d_n$".

In step S303, the calculation unit 140 sets the index ij indicating the target pixel to 0.

In step S304, the calculation unit 140 determines whether the processing depth is $d_n$, for a point P on the surface of the mold corresponding to the pixel p(ij). Specifically, in step S304, the calculation unit 140 determines whether an element plane including the pixel p(ij) is present and f2(p(ij)) =$d_n$ is satisfied.

As a result of the determination in step S304, in a case where the processing depth is $d_n$ for the point P on the surface of the mold corresponding to the pixel p(ij) (YES in step S304), the processing proceeds to step S305.

In step S305, the calculation unit 140 calculates the xyz coordinates of the point P on the surface of the mold corresponding to the pixel p(ij) based on the shape data. In the process, the xyz coordinates of the point P can be calculated by interpolation using the xyz coordinates of the vertexes of the element plane including the pixel p(ij).

In step S306 to step S316, the processing depth is checked for a point Q within a distance L determined beforehand from the point P on the surface of the mold, and in a case where the checked processing depth is deeper than the point P, the processing depth of the point Q is changed to a processing depth $d_{n-1}$ that is deeper than the processing depth $d_n$ of the point P by 1 step. A region having the processing depth $d_{n-1}$ and a width of L or more is thereby secured around the region having the processing depth $d_n$. The value of L is determined by, for example, generating samples beforehand by gradually changing the processing depth d using various region widths, and determining a region width for avoiding perception of a gap in texture by performing a subjective evaluation experiment.

Specifically, in step S306, the calculation unit 140 adds the element plane including the pixel p(ij) to a processing wait list.

In step S307, the calculation unit 140 determines whether there is an unprocessed element plane in the processing wait list.

As a result of the determination in step S307, in a case where there is an unprocessed element plane in the processing wait list (YES in step S307), the processing proceeds to step S308.

In step S308, the calculation unit 140 extracts one unprocessed element plane T from the processing wait list.

In step S309, the calculation unit 140 sets an index ij' indicating a processing target pixel to 0.

In step S310, the calculation unit 140 determines whether a pixel q(ij') is included in the element plane T extracted in step S308 and whether f2(q(ij'))>$d_n$ is satisfied.

As a result of the determination in step S310, in a case where the pixel q(ij') is included in the element plane T extracted in step S308 and f2(q(ij'))>$d_n$ is satisfied (YES in step S310), the processing proceeds to step S311.

In step S311, the calculation unit 140 calculates the xyz coordinates of the point Q on the surface of the mold corresponding to the pixel q(ij') based on the shape data.

In step S312, first, the calculation unit 140 calculates the distance between the points P and Q in the xyz coordinate space, using the xyz coordinates of the point P calculated in step S305 and the xyz coordinates of the point Q calculated in step S311. Subsequently, the calculation unit 140 determines whether the calculated distance between the points P and Q in the xyz coordinate space is smaller than or equal to the distance L determined beforehand.

As a result of the determination in step S312, in a case where the calculated distance between the points P and Q in the xyz coordinate space is smaller than or equal to the distance L determined beforehand (YES in step S312), the processing proceeds to step S313.

In step S313, the calculation unit 140 records the processing depth $d_{n-1}$ that is deeper than the processing depth $d_n$ by 1 step, as the pixel value of the pixel q(ij') in the processing parameter map emphasizing the continuity.

In a case where the process in step S313 is completed, in a case where the result of the determination in step S310 is negative (NO in step S310), or in a case where the result of the determination in step S312 is negative (NO in step S312), the processing proceeds to step S314.

In step S314, the calculation unit 140 increases the index ij' of the processing target pixel by 1.

In step S315, the calculation unit 140 determines whether the index ij' is larger than or equal to the total pixel number $NUM_{pix}$ of the processing parameter map. As result of the determination, in a case where the index ij' is smaller than the total pixel number $NUM_{pix}$ of the processing parameter map (NO in step S315), the processing returns to step S310 to perform the processes in step S310 and in steps after step S310 again.

As a result of the determination in step S315, in a case where the index ij' is larger than or equal to the total pixel number $NUM_{pix}$ of the processing parameter map (YES in step S315), the processing proceeds to step S316.

In step S316, the calculation unit 140 determines an element plane adjacent to the element plane T extracted in step S308 with reference to the shape data, and adds the determined element plane to the processing wait list. Upon completion of the process in step S316, the processing returns to step S307 to perform the processes in step S307 and in steps after step S307 again.

In a case where the determination in step S304 is negative (NO in step S304) or in a case where the determination in step S307 is negative (NO in step S307), the processing proceeds to step S317.

In step S317, the calculation unit 140 increases the index ij of the target pixel by 1.

In step S318, the calculation unit 140 determines whether the index ij is larger than or equal to the total pixel number $NUM_{pix}$ of the processing parameter map. As a result of the determination, in a case where the index ij is smaller than the total pixel number $NUM_{pix}$ of the processing parameter map (NO in step S318), the processing returns to step S304 to perform the processes in step S304 and in steps after step S304 again.

As a result of the determination in step S318, in a case where the index ij is larger than or equal to the total pixel number $NUM_{pix}$ of the processing parameter map (YES in step S318), the processing proceeds to step S319.

In step S319, the calculation unit 140 decreases the value of the index n indicating the processing depth by 1.

In step S320, the calculation unit 140 determines whether the index n is 1 or less. As a result of this determination, in a case where the index n is larger than 1 (NO in step S320), the processing returns to step S303 to perform the processes in step S303 and in steps after step S303 again.

As a result of the determination in step S320, in a case where the index n is 1 or less (YES in step S320), the processing in the flowchart illustrated in FIG. 13B ends.

The processing in step S301 to step S320 in FIGS. 13A and 13B makes it possible to generate the processing parameter map emphasizing the continuity, by which no difficulty in the mold release occurs and the processing depth d gradually changes on the surface of the molded product.

In the information processing apparatus 100 according to the first exemplary embodiment described above, the shape data acquisition unit 110 acquires the shape data indicating the three-dimensional shape of the mold for forming the molded product.

The mold release direction acquisition unit 120 acquires the mold release direction in separating the molded product from the mold, and the processing parameter acquisition unit 130 acquires the processing parameter for processing (micro processing) to be applied to the surface of the mold. The calculation unit 140 generates the plurality of processing parameter maps each indicating the correspondence between the position on the surface of the mold and the processing parameter based on the shape data and the mold release direction described above, and calculates the difference between the plurality of processing parameter maps. The notification unit 150 notifies the information about the difference between the plurality of processing parameter maps calculated by the calculation unit 140.

According to such a configuration, it is possible to easily recognize the trade-off region to be adjusted, which is generated when desired texture is given to the surface of the molded product (e.g., the uneven structure is provided), when the molded product is formed using the mold.

In the present exemplary embodiment, the example in which the user inputs only one direction as the mold release direction is described. However, for a mold composed of a plurality of pieces varying in opening direction, the mold release direction may be input for each of the pieces.

In the present exemplary embodiment, the example in which the processing depth d is recorded in the processing parameter map is described. However, other processing control parameter such as the processing diameter, or the combination of the values of a plurality of processing control parameters may be recorded.

In the present exemplary embodiment, the example of the case where the fidelity and the continuity of the surface texture of the molded product are emphasized is described, but the item to be emphasized may be other evaluation item about surface texture. For example, the present exemplary embodiment is also applicable to a case where an item in which evaluation increases as the height difference of the uneven structure is greater, such as matteness and brightness, is used in place of the fidelity.

A resin material or a molding condition to be used may be input in step S101 in FIG. 8. In this case, it is desirable to prepare the correspondence table indicating the correspondence between the texture name and the processing control parameter, and the processing upper limit LUT, for each of the combinations of various materials and molding conditions.

A second exemplary embodiment of the present disclosure will be described. In the description of the second exemplary embodiment, a description of matters common to the above-described first exemplary embodiment will be omitted, and a matter different from the above-described first exemplary embodiment will be mainly described.

In the above-described first exemplary embodiment, the mode is described in which the processing parameter map emphasizing each item is generated for each evaluation item, and the trade-off region to be adjusted is notified based on the difference between the generated processing parameter maps. In contrast, in the second exemplary embodiment, a mode will be described in which, in a case where a trade-off is determined to occur based on the difference between processing parameter maps, a processing parameter map is regenerated by acquiring an adjustment parameter from a user.

A hardware configuration of an information processing system 10 including an information processing apparatus 100 according to the second exemplary embodiment is similar to the hardware configuration of the information processing system 10 including the information processing apparatus 100 according to the first exemplary embodiment illustrated in FIG. 1 described above. A logical configuration of the information processing apparatus 100 according to the second exemplary embodiment is similar to the logical configuration of the information processing apparatus 100 according to the first exemplary embodiment illustrated in FIG. 2 described above. In the following description, a configuration similar to the configuration of the above-described first exemplary embodiment will be assigned the same reference numeral as that of the first exemplary embodiment.

In addition to having the function described in the above-described first exemplary embodiment, a calculation unit 140 in the second exemplary embodiment accepts an instruction from a user depending on information about an obtained difference, and regenerates a processing parameter map based on an adjustment parameter obtained via an input device 400. Further, the calculation unit 140 in the second exemplary embodiment generates a processing pattern based on shape data and a processing parameter map.

<Processing to Be Executed>

Figure 14:
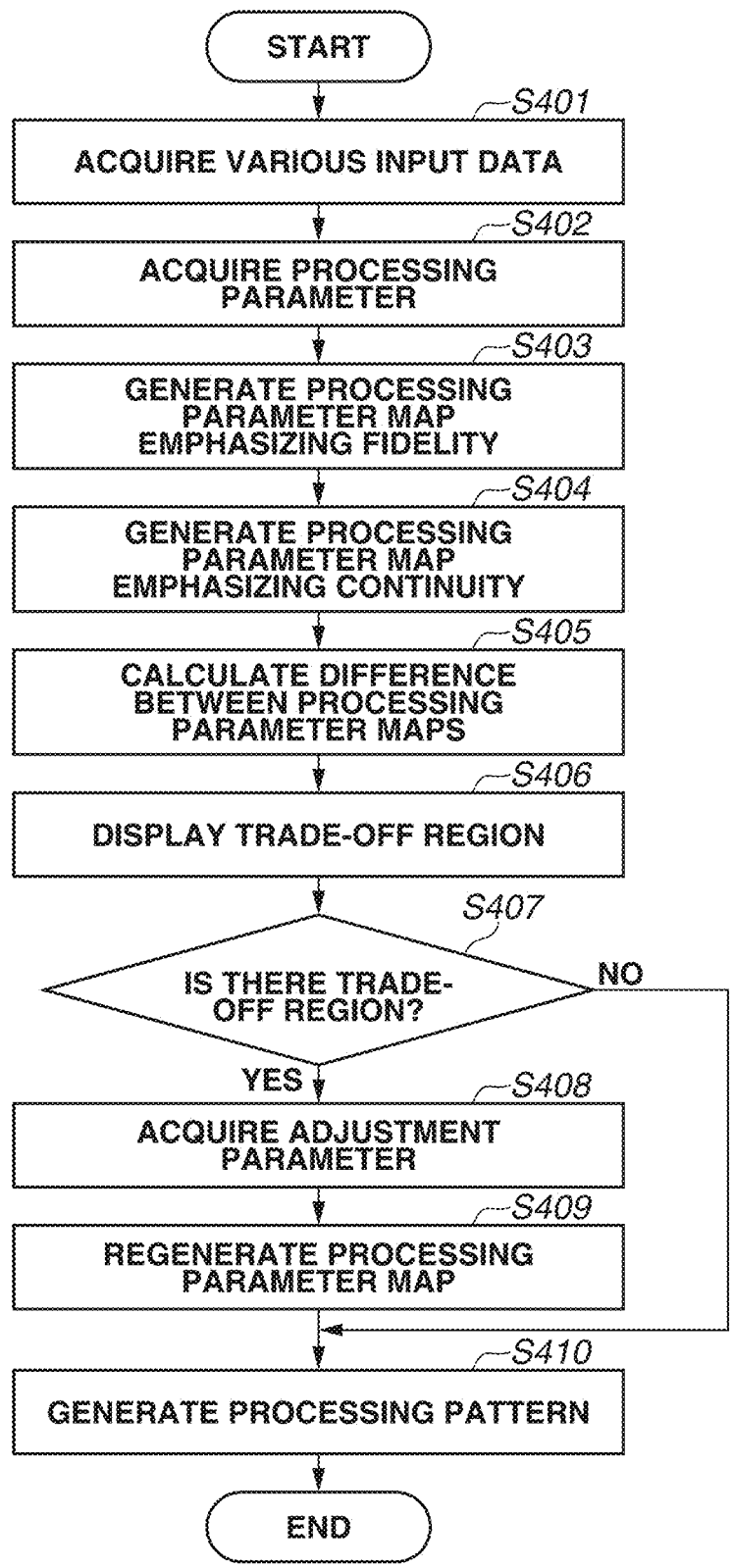
FIG. 14 is a flowchart illustrating an example of a processing procedure of an information processing method by an information processing apparatus according to the second exemplary embodiment.

FIG. 14 is a flowchart illustrating an example of a processing procedure of an information processing method performed by the information processing apparatus 100 according to the second exemplary embodiment of the present disclosure.

In the flowchart illustrated in FIG. 14, step S401 to step S406 are similar to step S101 to step S106 in the first exemplary embodiment illustrated in FIG. 8, and the description thereof will be omitted.

In step S407, the calculation unit 140 determines whether there is a trade-off region where a pixel value being not zero (also including a case where a pixel value can be regarded as substantially zero) is included in a difference map calculated in step S405.

As a result of the determination in step S407, in a case where there is a trade-off region (YES in step S407), the processing proceeds to step S408.

In step S408, the calculation unit 140 acquires an adjustment parameter by accepting a user instruction via the GUI 900. In the second exemplary embodiment, a coefficient indicating a balance between emphasis on fidelity and emphasis on continuity is acquired via a slider 909 illustrated in FIG. 9, and the coefficient is used as the adjustment parameter. When the slider 909 is operated by the user, the calculation unit 140 acquires a coefficient α corresponding to the position of the slider 909, as the adjustment parameter. As to the relationship between the position of the slider 909 in FIG. 9 and the coefficient α, for example, α=0 is determined in a case where the slider 909 is at the left end, and α=1 is determined in a case where the slider 909 is at the right end. In a case where the slider 909 is at a position between both ends, the corresponding coefficient is determined by interpolation based on the ratio between the distances from both ends.

In step S409, the calculation unit 140 regenerates a processing parameter map based on the adjustment parameter acquired in step S408. Specifically, the calculation unit 140 executes the above-described processing in step S301 to step S320 using a value obtained by multiplying the value of a distance L by the coefficient $\alpha$ (i.e., a value $\alpha$L replacing the distance L), and generates the processing parameter map in which the region width is adjusted based on the coefficient $\alpha$. The generated processing parameter map after the adjustment is the same as the processing parameter map emphasizing the fidelity in the case of $\alpha=0$, and is the same as the processing parameter map emphasizing the continuity in the case of $\alpha=1$. An example in which the processing parameter map after the adjustment is displayed on the GUI 900 is illustrated in FIG. 9. FIG. 9 illustrates an example of a case where the position of the slider 909 is at the center (i.e., in the case of $\alpha=0.5$), and a rendering image obtained by performing texture-mapping on the processing parameter map after the adjustment on the surface of the mold is displayed in a display region 907. In the processing parameter map after the adjustment, the change of a processing depth d is gentle as compared with the case of the emphasis on fidelity, and a region in which the processing depth d is deep (i.e., close to the processing depth d for reproducing desired texture) is wide as compared with the case of the emphasis on continuity. The user can adjust the change of the processing depth d by moving the slider 909 with reference to the displayed image, while visually understanding the distribution of the processing depth d. When a button 910 is pressed by the user, the adjustment parameter is determined and the processing proceeds to step S410.

In a case where the process in step S409 is completed or in a case where it is determined that there is no trade-off region in step S407 (NO in step S407), the processing proceeds to step S410.

In step S410, the calculation unit 140 generates the above-described processing pattern based on the shape data and the processing parameter map, and stores the generated processing pattern into an external storage device 200 or the like.

Upon completion of the process in step S410, the processing in the flowchart illustrated in FIG. 14 ends.

The processing pattern generated in step S401 may be output to a CAM system connected via a network, and processing by a processing machine may be executed base on the processing pattern. For the generation of the processing pattern, the processing parameter map after the adjustment regenerated in step S409 is used, in a case where it is determined that there is a trade-off region in step S407 (YES in step S407). In a case where it is determined that there is no trade-off region in step S407 (NO in step S407), for example, the processing parameter map emphasizing the fidelity generated in step S403 is used. In a case where there is no trade-off region, the processing parameter map emphasizing the fidelity and the processing parameter map emphasizing the continuity are identical to each other.

In the second exemplary embodiment, the calculation unit 140 generates an image 730 illustrated in FIG. 7C, as the processing pattern to be input to the CAM, based on the xyz coordinates and the uv coordinates of the vertexes of polygon indicated by the shape data, and the processing depth d and a processing density p indicated by the processing parameter map.

The details will be described with reference to FIGS. 7A to 7C. In a case where the area of a rectangle $P_{T1}P_{T2}P_{T3}$ in the xyz coordinate space is A, the number of pixels (■ in FIG. 7C) of the processing depth d that are included in the rectangle $P_{T1}P_{T2}P_{T3}$ on the processing pattern is A×ρ. When other pixels correspond to a processing depth 0 (□ in FIG. 7C), the processing density for the surface of the mold is equal to p. Accordingly, after the pixel values of the entire processing pattern are initialized using the processing depth 0, the pixels the number of which is A×ρ corresponding to the area of each plane are randomly selected from the inside of each plane, for all the element planes forming a surface shape 710, and the pixel values of the pixels are determined to have the processing depth d. A processing pattern for realizing desired texture can be thereby generated. The resolution of the processing pattern may be any resolution as long as the processing density can be sufficiently expressed the resolution (i.e., pixels the number of which is larger than or equal to A×ρ are included in the rectangle $P_{T1}P_{T2}P_{T3}$). In the selection of the pixels, the pixels may be selected according to other predetermined rule such as selection of equally spaced pixels, instead of being selected at random.

In the information processing apparatus 100 according to the second exemplary embodiment described above, the calculation unit 140 acquires the adjustment parameter related to the processing parameter map based on the above-described information about the difference, and regenerates the processing parameter map based on the adjustment parameter.

According to the second exemplary embodiment, in addition to having the effect in the above-described first exemplary embodiment, it is possible to adjust the processing control parameter easily in a case where the trade-off occurs between the evaluation items.

Figure 15:
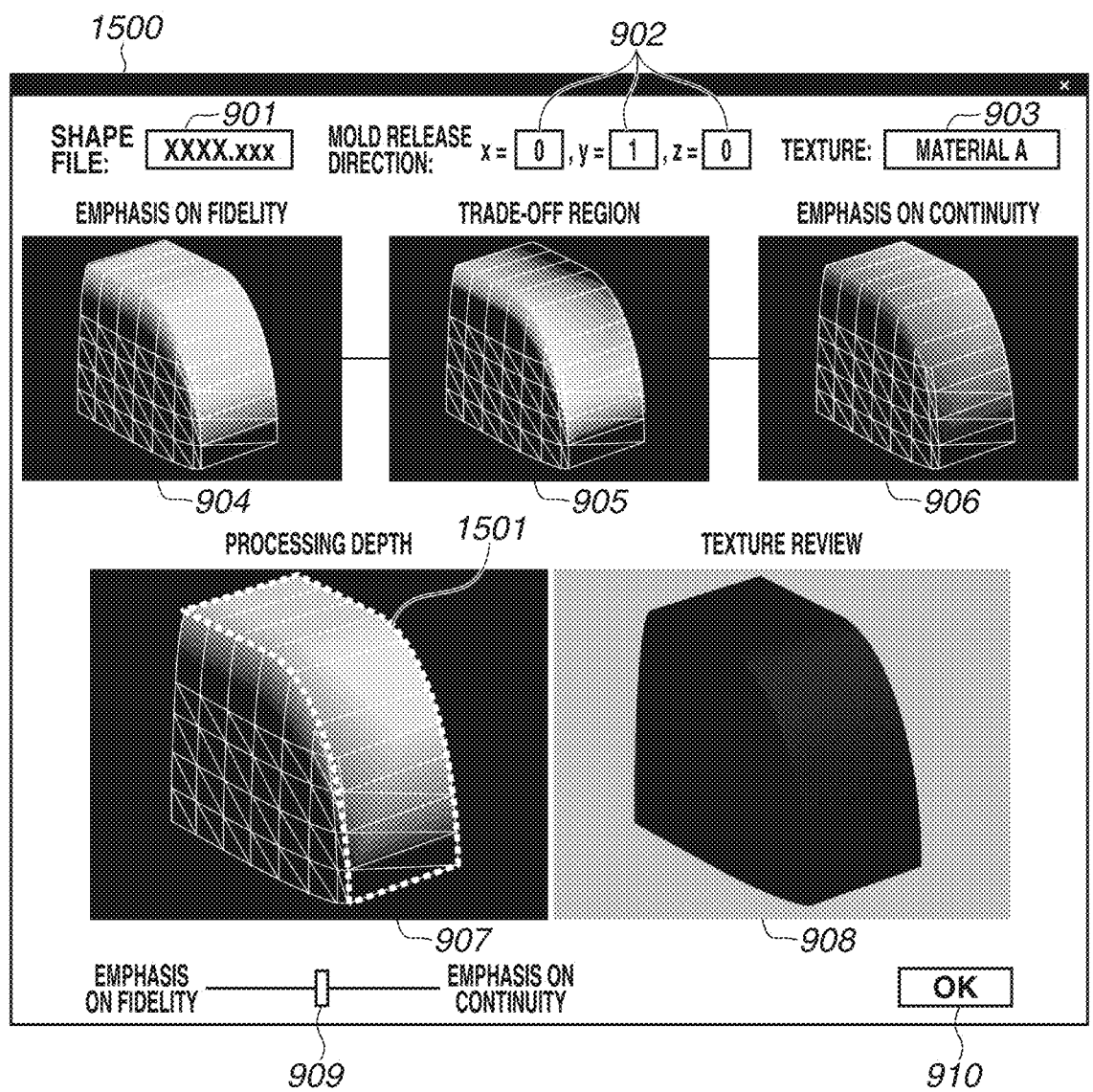
FIG. 15 is a diagram illustrating an example of a GUI in the second exemplary embodiment.

In the present exemplary embodiment, the example in which the entire processing parameter map is regenerated in step S409 in FIG. 14 is described, but the present exemplary embodiment is also applicable to a mode in which only a partial region is regenerated. The mode in this case will be described with reference to FIG. 15. FIG. 15 is a diagram illustrating an example of a GUI displayed on a display 300 in FIG. 1, in the second exemplary embodiment of the present disclosure. In FIG. 15, configurations similar to the configurations illustrated in FIG. 9 are assigned the same reference numerals as those in FIG. 9 and the description thereof will be omitted.

In the case of the above-described mode in which only the partial region is regenerated, for example, upon generation of the entire processing parameter map after the adjustment, a region 1501 selected by the user via a GUI 1500 illustrated in FIG. 15 is acquired. The processes in step S304 to step S316 in FIGS. 13A and 13B are applied again to only pixels in a region, which corresponds to the region 1501 selected by the user, on the processing parameter map, so that the processing depth d can be calculated again.

In the present exemplary embodiment, a simulation image indicating a molded product outer appearance in a case where an uneven structure is provided using the generated processing pattern may be displayed on the GUI, as displayed in a display region 908 in FIG. 9. Alternatively, the difference from the target processing depth in each pixel may be calculated using the processing parameter map after the adjustment, and a rendering image obtained by performing texture-mapping on the calculated difference on the surface of the mold as an index representing a deviation from the desired texture may be displayed. Alternatively, an amount of change of the processing depth in each pixel may be calculated by applying a differential filter to the processing parameter map after the adjustment, and a rendering image obtained by performing texture-mapping on the calculated amount of change on the surface of the mold as an index representing a gap in texture may be displayed.

In the present exemplary embodiment, the example in which the user acquires the coefficient indicating the balance between the emphasis on fidelity and the emphasis on continuity as the adjustment parameter is described, but an adjustment amount corresponding to the value of the distance L described above may be input.

According to the exemplary embodiments of the present disclosure, the portion to be adjusted can be recognized when the molded product is formed using the mold.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-188574, filed Nov. 19, 2021, which is hereby incorporated by reference herein in its entirety.

What is claimed is:

1. An information processing apparatus for designing a mold for forming a molded product, comprising:
a processor; and
memory storing program instructions that, when executed by the processor, cause the information processing apparatus to perform operations comprising:
acquiring shape data indicating a three-dimensional shape of the mold prior to a processing to be applied to a surface of the mold;
acquiring a mold release direction in separating the molded product from the mold;
acquiring a processing parameter for the processing to be applied to the surface of the mold;
generating a first processing parameter map and a second processing parameter map;
calculating, based on the shape data, the mold release direction, and the processing parameter, a difference between the first processing parameter map and the second processing parameter map, the first processing parameter map and the second processing parameter map each indicating a correspondence between a position on the surface of the mold and the processing parameter;
based on information about the difference, acquiring an adjustment parameter based on a user instruction via a user interface, the adjustment parameter indicating a balance between emphasis on fidelity of surface texture of the molded product and emphasis on continuity of the surface texture of the molded product;
generating a third processing parameter map based on the adjustment parameter; and
notifying the information about the difference.

2. The information processing apparatus according to claim 1, wherein at least one of the first processing parameter map and the second processing parameter map is a processing parameter map related to the surface texture of the molded product.

3. The information processing apparatus according to claim 1, wherein the first processing parameter map emphasizes fidelity of the surface texture of the molded product, and the second processing parameter map emphasizes continuity of the surface texture of the molded product.

4. The information processing apparatus according to claim 1, wherein the notifying notifies the information, by displaying information indicating a region where the difference is not substantially zero in the shape data.

5. The information processing apparatus according to claim 1, wherein the notifying notifies the information, by displaying information indicating color having intensity corresponding to amount of the difference in the shape data.

6. The information processing apparatus according to claim 1, wherein the adjustment parameter is a parameter for adjusting a balance between the first processing parameter map and the second processing parameter map.

7. The information processing apparatus according to claim 1, further comprising a display configured to display a rendering image corresponding to each of the first processing parameter map and the second processing parameter map.

8. The information processing apparatus according to claim 1, wherein the mold is configured to form minute irregularities on a surface of the molded product.

9. The information processing apparatus according to claim 1, wherein the acquiring the mold release direction acquires a three-dimensional vector indicating the mold release direction, as the mold release direction.

10. An information processing method for designing a mold for forming a molded product, the information processing method comprising:
acquiring shape data indicating a three-dimensional shape of the mold prior to a processing to be applied to a surface of the mold;
acquiring a mold release direction in separating the molded product from the mold;
acquiring a processing parameter for the processing to be applied to the surface of the mold;

generating a first processing parameter map and a second processing parameter map;

calculating, based on the shape data, the mold release direction, and the processing parameter, a difference between the first processing parameter map and the second processing parameter map, the first processing parameter map and the second processing parameter map each indicating a correspondence between a position on the surface of the mold and the processing parameter;

based on information about the difference, acquiring an adjustment parameter based on a user instruction via a user interface, the adjustment parameter indicating a balance between emphasis on fidelity of surface texture of the molded product and emphasis on continuity of the surface texture of the molded product;

generating a third processing parameter map based on the adjustment parameter; and notifying the information about the difference.

11. A non-transitory computer-readable storage medium storing instructions that, when executed by a computer, cause the computer to perform an information processing method for designing a mold for forming a molded product, the information processing method comprising:

acquiring shape data indicating a three-dimensional shape of the mold prior to a processing to be applied to a surface of the mold;

acquiring a mold release direction in separating the molded product from the mold;

acquiring a processing parameter for the processing to be applied to the surface of the mold;

generating a first processing parameter map and a second processing parameter map;

calculating, based on the shape data, the mold release direction, and the processing parameter, a difference between the first processing parameter map and the second processing parameter map, the first processing parameter map and the second processing parameter map each indicating a correspondence between a position on the surface of the mold and the processing parameter;

based on information about the difference, acquiring an adjustment parameter based on a user instruction via a user interface, the adjustment parameter indicating a balance between emphasis on fidelity of surface texture of the molded product and emphasis on continuity of the surface texture of the molded product;

generating a third processing parameter map based on the adjustment parameter; and notifying the information about the difference.

* * * * *